Aug. 10, 1937.    J. B. BROWN ET AL    2,089,173
POWER BRAKE MEANS FOR AUTOMOTIVE VEHICLES
Filed April 15, 1935    3 Sheets-Sheet 1
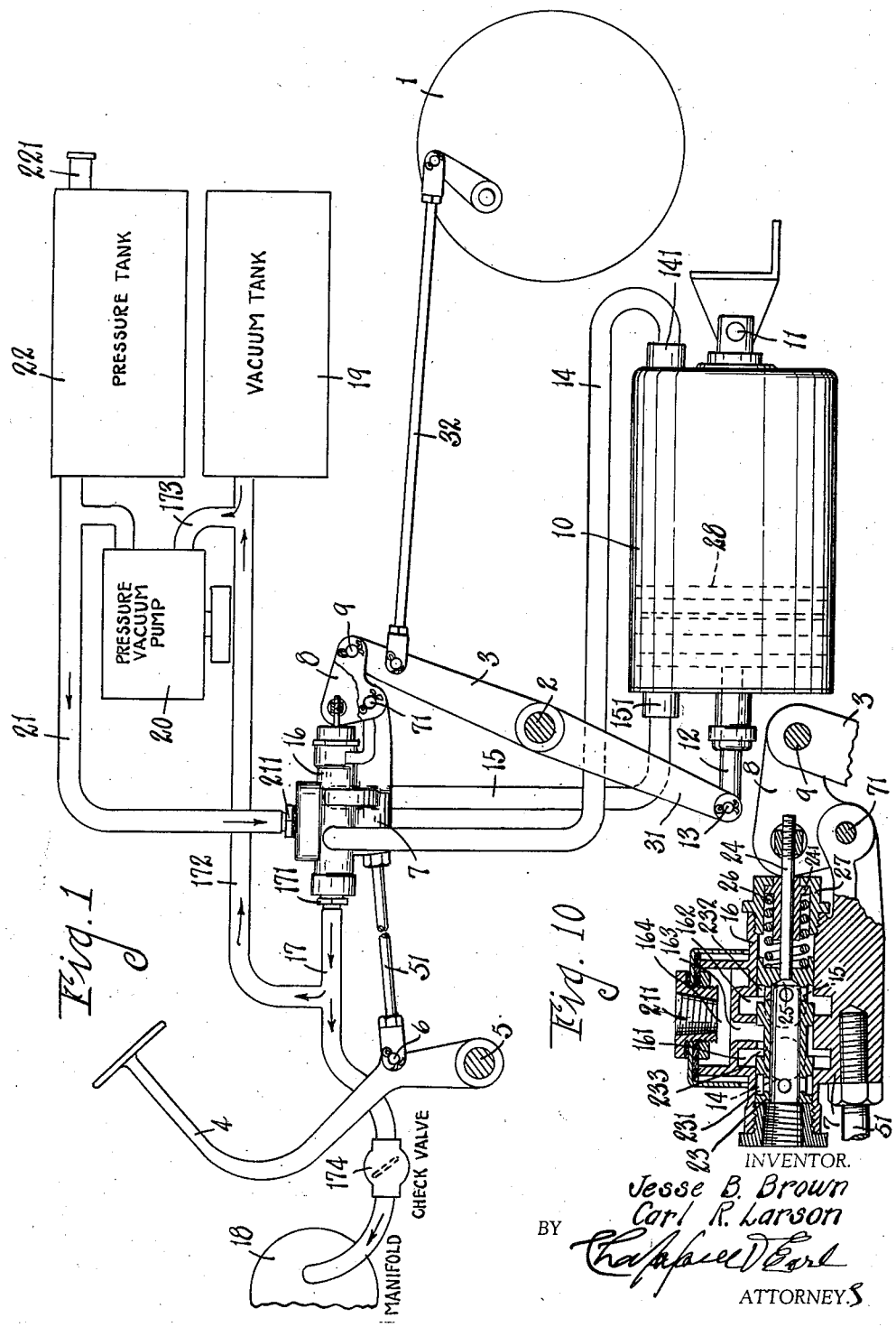
INVENTOR.
Jesse B. Brown
Carl R. Larson
BY
ATTORNEYS

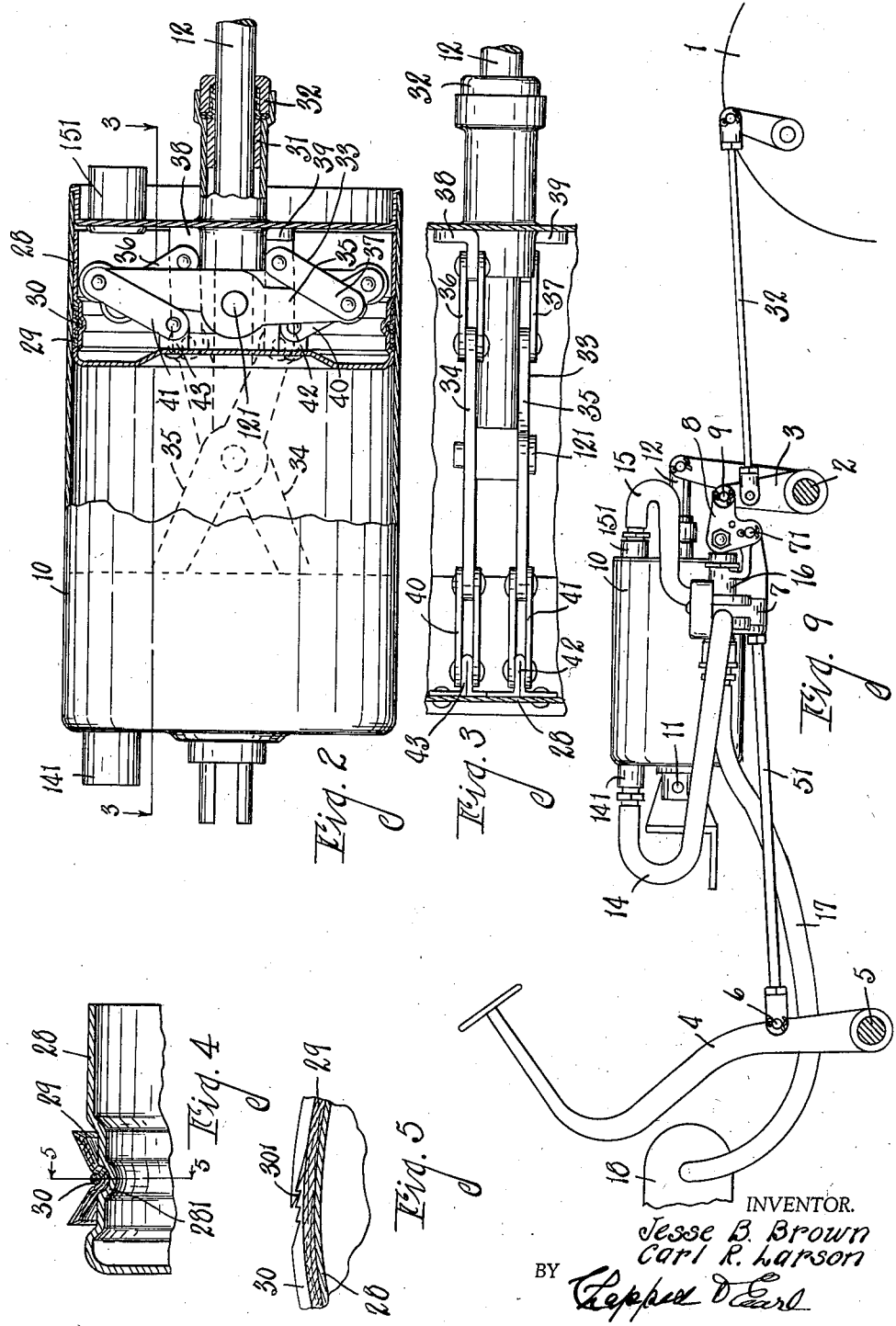

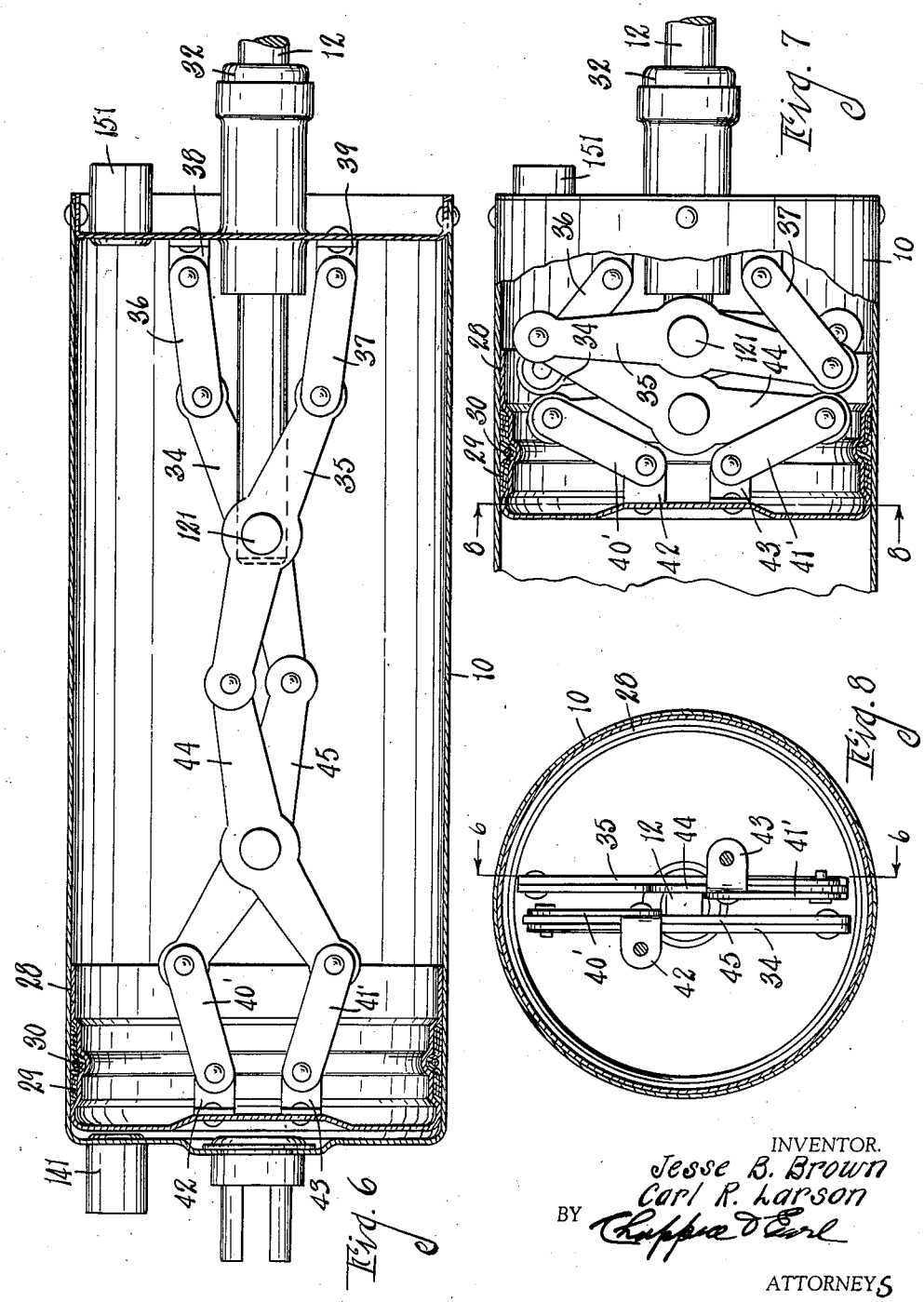

Patented Aug. 10, 1937

2,089,173

UNITED STATES PATENT OFFICE 2,089,173

POWER BRAKE MEANS FOR AUTOMOTIVE VEHICLES

Jesse B. Brown and Carl R. Larson, Oconomowoc, Wis., assignors, by mesne assignments, to Airdraulic Brake Control Corporation, a corporation of Wisconsin Application April 15, 1935, Serial No. 16,346

7 Claims. (Cl. 121—38)

The objects of this invention are:

First, to provide such a vacuum brake structure that is compact and will apply brakes with maximum power, the same being so constructed that moderate vacuum pressure will apply strong pressure to the brakes.

Second, to provide an improved construction of power cylinder that is double acting and at the same time utilizes a special linkage and leverage to produce speedy action and high pressure at the finish.

Third, to provide an improved auxiliary power plant for a pedal brake structure.

Fourth, to provide an improved cylinder and piston for such a structure.

Fifth, to provide an improved valve means.

Further objects and advantages pertaining to details and economies of construction and operation will appear from the description to follow. A preferred embodiment of our invention is illustrated in the accompanying drawings, in which:

Fig. 1 is an elevation view largely diagrammatic of a brake structure embodying our improvements.

Fig. 2 is an enlarged detail elevation view of our improved cylinder partly in central section.

Fig. 3 is a detail elevation view of the lazy tong lever connection of the piston cylinder and power plunger with the sides of the cylinder and piston broken away and the end walls sectioned on line 3—3 of Fig. 2.

Fig. 4 is an enlarged longitudinal section detail of the piston head and packing.

Fig. 5 is an enlarged detail section of the packing and means of retaining taken on line 5—5 of Fig. 4.

Fig. 6 is a central sectional elevation of a modification of our power cylinder structure where the lazy tong is extended and a longer cylinder of less diameter gives increased results, the piston being at the bottom or inner end of the cylinder showing the links and connection extended and the actuating plunger withdraw into the cylinder.

Fig. 7 is a detail view similar to Fig. 6 with the piston at the head end of its stroke forcing the actuating plunger out.

Fig. 8 is a detail cross section on line 8—8 of Fig. 7, showing the disposition of the lazy tong collapsed.

Fig. 9 shows our improvement applied in a simple form, the accumulator take-ups being omitted.

Fig. 10 is a vertical longitudinal section through the complete valve, the position of the connections of the pipes to the power cylinder being indicated by dotted lines.

The parts will be identified by their numerals of reference which are the same in all the views.

1 is the brake conventionally illustrated and may be a four-wheel hydraulic or a two-wheel brake as circumstances may require. 2 is the brake rockshaft supported in the chassis in any suitable way. 3 is the brake lever carried by the brake rockshaft. 4 is the brake pedal carried on its fulcrum 5 suitably supported in the chassis in any way desired or required. 51 is the brake rod pivoted at 6 to the brake pedal lever 4 and connected to the boss 7 which is provided on the valve casing. On this is fulcrumed at 71 the bent valve lever 8 which is pivotally connected at 9 to the brake lever 3. 32 is the brake rod connecting the brake lever 3 to the brake 1.

10 is a double acting cylinder trunnioned at 11 and provided with a projecting actuating plunger 12 which is connected at 13 to an extension 31 of the brake lever 3. 14 is the pipe connecting to the bottom end of the cylinder by the connection 141. 15 is the pipe leading to the top or head end of the cylinder 10 connected thereto by the connection 151. These are connected to the valve casing 16. The forward end of the valve casing 16 is connected to the vacuum pipe 17 which leads to the manifold 18, being connected to the valve by the connection 171. A branch 172 from the vacuum pipe 17 leads from the vacuum tank 19 with a branch 173 leading to the pressure vacuum pump 20. Vacuum pump 20 is belt driven by pulley 20' or by any power available. The pump, tank and connections are illustrated diagrammatically and may be of any desired form. A check valve 174 is in the pipe 17 between the manifold 18 and the rest of the apparatus. A pipe 21 leads from the pressure tank 22 to connection 211 on the top side of the valve casing 16.

The pressure vacuum pump is connected to the pressure pipe 211 and of course supplies the same to discharge air to the valve and also fills the pressure tank to the pressure required. A relief valve 221 is provided for the pressure tank.

The valve casing 16 is provided with annular port 161, which is connected to pipe 14 indicated by dotted lines in Fig. 10 leading to the power cylinder 10, and by an annular port 162, which is connected to the pipe 15 also indicated by dotted lines in Fig. 10. The valve casing is also provided with a central air port 163 connected to chamber 164 which chamber is connected to the pipe 21 by the connection 211. The valve 23 is hollow, open at its bottom, and connects to the vacuum chamber in the valve 16. It is provided with annular ports toward each end 231 and 232 which are connected by cross bores to the central hollow of the valve. The valve is provided with an annular port 233 which connects with the central port 163 of the valve casing 16 at all times and connects the same alternately with the ports 161 and 162 to deliver the pressure through the pipes 14 or 15, as the case may be, to the power cylinder 10.

The valve is actuated by the lever 8 to which is pivotally connected the valve stem 24 which stem is provided with a head 25 within the hollow valve. The valve is urged to the left by the coil spring 26 within the enclosing cap 27. The valve stem 24 is provided with the bearing bushing 241 and the cap effectively seals the same.

The engine cylinder is provided with a trunk piston 28 which is double acting and is provided with a packing consisting of a leather ring 29 retained in an annular seat 281 in the piston by the retaining wire 30 which retaining wire forms a ring having an adjustable closed end with reversed teeth 301, see Fig. 5, for locking the same in position. When the ring 30 is forced into the leather packing, it causes the edges to flare slightly and make a perfect packing in both directions for the piston 28. Other double packings might be used but this is especially effective and economical to produce and avoids dividing the piston which would be the ordinary way of securing such packings in place.

The plunger 12 is not connected to the piston but extends through a bushing 31 provided with a stuffing box 32. The plunger 12 is connected by cross pivot 121 to the lazy tong lever construction 33 within the cylinder. This is made up of a pair of crossed levers 34 and 35 which, toward the head of the cylinder, are connected by links 36, 37 to lugs 38, 39 secured to the cylinder top. The opposite ends of the levers are secured to the piston head by links 40, 41, see Fig. 3, by lugs 42, 43 secured to the top or head of the piston.

In the modification appearing in Fig. 6, I show an additional pair of lazy tong levers 44, 45 connected to the levers 34, 35 respectively, and these levers are connected by links 40', 41' exactly like links 40, 41 to the piston head.

Where the single pair of levers 34, 35 are used, they move into compact relation as indicated in Fig. 2. Where the lever system is extended by the addition of levers when the same are collapsed, they take the position indicated in Fig. 7 and when the piston is at the bottom of its stroke these levers are extended as appears in Fig. 6. The full benefit of the lazy tong action is secured in the structures illustrated in Figs. 6 and 7.

The benefit of increased power is secured as one of the pair of structures illustrated in Figs. 2 and 3 is made use of. For instance, what is above the rod 12 in Fig. 3, namely, the lever 34 pivoted on the pivot 121 and connected to the head of the cylinder by lug 38 and the link 36 and to the piston by the link 40 pivoted to the lug 43 secured to the piston head secures the results.

We apply the vacuum at one side of the piston 28 in each actuation and on the opposite side apply pressure from the pressure tank so that we have double power for actuating the brake and this causes the piston to move very rapidly and as the resistance is small at the start it develops motion very easily and if the pressure and suction continue well to the end, the lever action is increased so that the plunger applies the brake very powerfully and yet the piston is free to move very easily until the point of applying the power to the brake is reached.

The lever structure is very effective when simply one of the pair of levers is made use of as appears in Figs. 2 and 3. We desire to claim the same broadly along with the complete lazy tong structure.

Having thus described our invention, what we claim as new and desire to secure by Letters Patent, is:

1. In a power cylinder for brake construction, the combination with a cylinder, with heads at both ends and with connections for operating medium, a trunk piston therein made of a sheet metal stamping forming a suitable head and skirting, lazy tong connections within the said cylinder, with a pair of opposed pivoted link connections to the head of the cylinder at each side of the center, and a pair of opposed pivoted link connections to the head of the piston disposed symmetrically each side of the center, pairs of pivoted lazy tong arms between the said pairs of said links, an actuating plunger connected to the pivot between a pair of said lazy tong levers and extended outwardly through the head of the cylinder, and a stuffing box on the head of the cylinder for the said actuating plunger.

2. In a power cylinder for brake construction, the combination with a cylinder, a piston adapted to travel within the cylinder, lazy tong connections within the said cylinder between the head thereof and the said piston, a pair of links disposed on opposite sides of the center for attachment of the lazy tongs to the head of the cylinder, a pair of corresponding links on the said piston pivotally connected each side of the center and connected to the lazy tong arms arranged to fold into compact relation between the piston head and cylinder head, and a plunger disposed through the cylinder head with the inner end connected to said lazy tongs to be actuated thereby.

3. In a power cylinder for brake construction, the combination with a cylinder, a piston adapted to travel within the cylinder, lazy tong connections within the said cylinder between the head thereof and the said piston arranged to fold into compact relation between the piston head and cylinder head, and a plunger disposed through the cylinder head with the inner end connected to said lazy tongs to be actuated thereby.

4. In a power cylinder for brake construction, the combination with a cylinder, a trunk piston adapted to travel within the cylinder, lazy tong connections within the said cylinder between the bottom head thereof and the said piston arranged to fold into compact relation between the piston head and cylinder head and a rod actuated by a connection to said lazy tongs adapted to reciprocate axially of said cylinder through its top head.

5. In a power cylinder for brake construction, the combination with a cylinder, a trunk piston adapted to travel within the cylinder, lazy tong connections within the said cylinder between the bottom head thereof and the said piston arranged to fold into compact relation between the piston head and bottom cylinder head, and a rod actuated by connection to said lazy tongs.

6. In a power cylinder for brake construction, the combination with a cylinder, a trunk piston adapted to travel within the cylinder, lazy tong connections within the said cylinder between the bottom head thereof and the said piston arranged to fold into compact relation between the piston head and bottom cylinder head, and a rod actuated by connection to said lazy tongs.

7. In a power cylinder for brake construction, the combination of a cylinder, a trunk piston adapted to travel within the cylinder, a folding lever connection within the said cylinder between the bottom head thereof and the said piston arranged to fold in compact relation between the trunk piston and the bottom cylinder head, and a plunger disposed through a stuffing box in the cylinder head and an inner pivotal connection of said plunger to the lever within the said cylinder, whereby the plunger is actuated by the lever connection when the trunk piston is actuated.

JESSE B. BROWN.
CARL R. LARSON.